FILTER CIRCUIT FOR REMOTE CONTROL INSTALLATION

Filed Nov. 19, 1952

Inventor.
George Ogurkowski.
by
Morgan, Finnegan & Durham
Attorneys.

United States Patent Office 2,734,173

Patented Feb. 7, 1956

2,734,173

FILTER CIRCUIT FOR REMOTE CONTROL INSTALLATION

Georges Ogurkowski, Zug, Switzerland, assignor to Landis & Gyr, A. G., a body corporate of Switzerland Application November 19, 1952, Serial No. 321,367

Claims priority, application Switzerland June 23, 1945

1 Claim. (Cl. 333—70)

The present invention relates to a circuit arrangement for the audio-frequency coupling of two heavy current power circuits, which are normally incapable of being coupled.

Coupling filters are already known, which have a compensating member for the audio-frequency coupling of audio-frequency generators with a power circuit. The combination of two four-terminal networks there employed has the special property that, for the passage of the audio-frequency currents, the input resistance of the filter is equal to the output resistance on the network side. By such an arrangement, with any desired power circuit resistance, no additional inductive and capacitive loads occur, which would involve drawing additional energy from the audio-frequency generator. This condition however only applies in one direction of the energy flow, viz. only from the audio-frequency side towards the mains circuit side, and moreover, only for one narrow band of frequencies.

If now it be desired to couple two power circuits which have different frequencies, i. e. are not synchronous or if synchronous have voltage vectors with a constant difference of phase, or because of too great a difference of voltage at any definite place are incapable of being connected and yet are capable of being connected in respect of audio-frequency currents, it is not advantageous to connect two coupling filters of the known kind in series and to connect the two remaining output ends with the two mains circuit. Such a solution would be extremely expensive, and take up a great amount of space. Moreover, the audio-frequency current would flow in the reverse direction in one filter, with resultant loss of power.

According to the invention, and in accordance with its object, these difficulties are overcome and an intermediate coupling filter is provided for the audio-frequency coupling of two heavy current networks normally incapable of being coupled. The invention further permits the audio-frequency current to be transmitted in both directions, and consists of two four-terminal networks which do not allow the power frequency currents to pass and which have connected between them in series a compensating four terminal network in such a manner that, in either direction of energy flow, the input resistance of the whole four-terminal network combination is equal to the output resistance thereof.

It will be understood that the foregoing general description and the following detailed description as well are exemplary and explanatory of the invention but are not restrictive thereof.

In the attached drawing an example of embodiment of such a four pole combination is shown.

Figure 1:
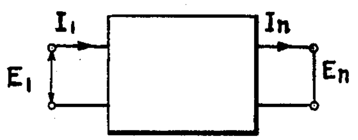
Fig. 1 is a diagrammatic representation of a four-pole.

Referring to Fig. 1, let V be any passive four terminal network with sinusoidal voltages applied across the terminals 1 and 2, and across 1′ and 2′, as indicated in the figure.

The term "matrix of the network V" will be used to refer to the array of quantities (constant for fixed frequencies):

$$\begin{Vmatrix} A & B \\ C & D \end{Vmatrix}$$

such that:

$$E_1 = AE_n + BI_n$$
$$I_1 = CE_n + DI_n$$

These quantities will now be evaluated in terms of the components of the network according to standard methods of network analysis.

Assume V has X branches and N nodes. Then, according to a well known theorem there are $X-N+1=n$ independent meshes (loops) in V, and a complete description of the current flow can be obtained from a consideration of any $n$ independent meshes.

Choose in V any $n$ independent meshes such that mesh 1 contains $E_1$, mesh $n$ contains $E_n$, and the remaining meshes are entirely passive. Equating the voltage drops to the applied voltages this gives a set of $n$ equations.

(1)
$$\begin{aligned} I_1Z_{11}+I_2Z_{12}+ \cdots +I_nZ_{1n} &= E_1 \\ I_1Z_{21}+I_2Z_{22}+ \cdots +I_nZ_{2n} &= 0 \\ &\vdots \\ I_1Z_{n1}+I_2Z_{n2}+ \cdots +I_nZ_{nn} &= -E_n \end{aligned}$$

where $I_j$ is the current in the $j$th loop and $$Z_{ij} = R_{ij} + PL_{ij} + \frac{1}{PC_{ij}}$$

the subscript $ii$ referring to the sum of all such elements in the $i$th mesh and the subscript $ij$ $(i \neq j)$ referring to the sum of all such elements common to the $i$th and $j$th mesh. R, L, C, and $p$ have their usual meanings of resistance, inductance, capacitance, and differentiation with respect to time.

Solution of Equations 1 gives:

(2)
$$I_1 = \alpha_{11}E_{11} - \alpha_{1n}E_n$$
$$I_n = \alpha_{1n}E_1 - \alpha_{nn}E_n$$

where $\alpha_{11}$, $\alpha_{1n}$, $\alpha_{nn}$ are simple rational functions of the $Z_{ij}$ (2$a$) given in terms of determinants by:

$$\alpha_{ij} = \frac{M_{ij}}{D}$$

where:

(2$b$)

$$D = \begin{vmatrix} Z_{11} & \cdots & Z_{1n} \\ Z_{21} & \cdots & Z_{2n} \\ \vdots & & \\ Z_{n1} & \cdots & Z_{nn} \end{vmatrix}$$

$$M_{ij} = (-1)^{i+j} \begin{vmatrix} Z_{11} & \cdots & Z_{1(j-1)}Z_{1(j+1)} & \cdots & Z_{1n} \\ \vdots & & & & \\ Z_{(i-1)1} & \cdots & Z_{(i-1)(j-1)}Z_{(i-1)(j+1)} & \cdots & \\ Z_{(i+1)1} & \cdots & Z_{(i+1)(j-1)}Z_{(i+1)(j+1)} & \cdots & \\ \vdots & & & & \\ Z_{n1} & \cdots & Z_{n(j-1)}Z_{n(j+1)} & \cdots & Z_{nn} \end{vmatrix}$$

$M_{ij}$ being the minor of the element $Z_{ij}$ in D. This solution is obtained by a direct application of Cramer's rule to (1).

Solving (2) for $I_1$ and $E_1$ in terms of $I_n$ and $E_n$ gives:

$$(3)\quad \begin{aligned} E_1 &= AE_n + BI_n \\ I_1 &= CE_n + DI_n \end{aligned}$$

where A, B, C, and D are by definition the elements of "the matrix of the network V," and can be computed from (2) by simple algebra to be:

$$(4)\quad A = \frac{\alpha_{nn}}{\alpha_{1n}} \qquad B = \frac{1}{\alpha_{1n}}$$
$$C = \frac{\alpha_{11}\alpha_{nn} - \alpha_{1n}^2}{\alpha_{1n}} \qquad D = \frac{\alpha_{11}}{\alpha_{1n}}$$

Figure 3:
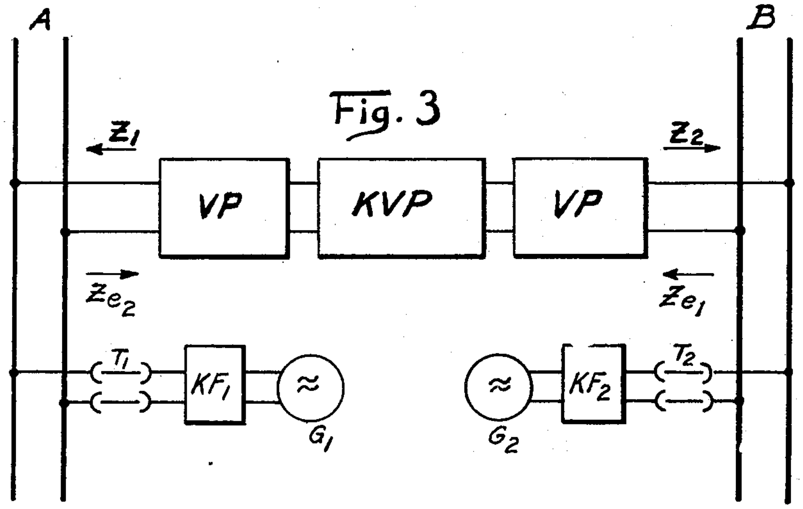
Fig. 3 is a four-pole combination.

Now the invention itself will be disclosed. Figure 3 is a schematic circuit diagram showing one embodiment of the present invention.

In this drawing, A and B denote two heavy current power circuits normally incapable of being coupled, and for the sake of simplicity only single phase mains are shown. In the circuit A there is included an audio-frequency current generator $G_1$ which operates through a coupling filter $KF_1$ and an isolating switch $T_1$, while in the circuit B another audiofrequency current generator $G_2$ operates through a coupling filter $KF_2$, and an isolating switch $T_2$. The two circuits A and B are each connected to four-terminal networks VP and the latter networks are connected in series with one another through a compensating four terminal network KVP. In this arrangement, the two four-terminal networks VP serve for holding back the power circuit frequency currents from the compensating four-terminal network KVP, and the latter has such properties that the whole four-terminal network combination is adapted to transmit the audio-frequency currents without loss. By means of this arrangement, it is possible to transmit the control currents required from the generator $G_1$ to the circuit B, whilst conversely the control currents from the generator $G_2$ can also be transmitted to the circuit A. Obviously, only one of the two generators is normally in operation, while the other is isolated from its power circuit.

In the embodiment, the terminal resistance $Z_1$ of the four-terminal network combination is formed by the power circuit A, the terminal resistance $Z_2$ is formed by the circuit B; $Z_{e1}$ denotes the input resistance towards the circuit A and $Z_{e2}$ denotes the input resistance towards the circuit B.

In accordance with the invention, the input resistance $Z_{e2}$ should be equal to the terminal resistance $Z_2$ and $Z_{e1}$ should be equal to the terminal resistance $Z_1$.

If M be the matrix of the four-terminal network VP, the two matrices should be constructed equal and should operate in the same manner, thus $$(5)\quad M = \left\| \begin{matrix} a_{11} & a_{12} \\ a_{21} & a_{22} \end{matrix} \right\|$$

wherein the determinant of the matrix $$(6)\quad \begin{vmatrix} a_{11} & a_{12} \\ a_{21} & a_{22} \end{vmatrix} = a_{11}a_{22} - a_{12}a_{21} = 1$$

expresses a condition for the passivity of the four-terminal network VP, when it is equal to unity, according to a well known theorem. The matrix of the compensating four-terminal network runs as follows:

$$(7)\quad M_k = \left\| \begin{matrix} b_{11} & b_{12} \\ b_{21} & b_{22} \end{matrix} \right\|$$

wherein again the determinant of the matrix should be $$(8)\quad \begin{vmatrix} b_{11} & b_{12} \\ b_{21} & b_{22} \end{vmatrix} = b_{11}b_{22} - b_{12}b_{21} = 1$$

since in accordance with the primary assumption the compensating four-terminal network should be passive.

It is known that, in the series connection of four-terminal networks, the matrices of the four terminal networks must be multiplied together, in which case the resultant matrix forms the matrix of the series connection. Also in this case, the matrices must be multiplied together in corresponding sequence. We assume provisionally that the elements of the matrix $M_k$ are still unknown and make the assumption that there exists a passive four-terminal network which fulfills the condition that, when connected in series, in the middle of two identical assumed four-terminal networks the matrix product gives the unitary matrix, i. e. it must be (evaluated at the audio-frequency)

$$(9)\quad M \cdot M_K \cdot M = \left\| \begin{matrix} a_{11} & a_{12} \\ a_{21} & a_{22} \end{matrix} \right\| \cdot \left\| \begin{matrix} b_{11} & b_{12} \\ b_{21} & b_{22} \end{matrix} \right\| \cdot \left\| \begin{matrix} a_{11} & a_{12} \\ a_{21} & a_{22} \end{matrix} \right\| = \left\| \begin{matrix} 1 & 0 \\ 0 & 1 \end{matrix} \right\|$$

It is now asserted that the elements of the matrix $M_k$, i. e. the quantities $b_{11}$, $b_{12}$, $b_{21}$, $b_{22}$ can be calculated from the elements of the previously given four-terminal network matrix M, i. e. the quantities $a_{11}$, $a_{12}$, $a_{21}$, $a_{22}$ viz. they are determined from the following equations:

$$(10)\quad b_{11} = a_{22}^2 + a_{12}a_{21};\ b_{12} = -a_{12}(a_{11} + a_{22})$$
$$b_{21} = -a_{21}(a_{22} + a_{11});\ b_{22} = a_{11}^2 + a_{12}a_{21}$$

The proof is brought about by calculating out the product of the matrices:

$$(11)\quad M \cdot M_K \cdot M =$$
$$\left\| \begin{matrix} a_{11} & a_{12} \\ a_{21} & a_{22} \end{matrix} \right\| \cdot \left\| \begin{matrix} a_{22}^2 + a_{12}a_{21}; & -a_{12}(a_{11} + a_{22}) \\ -a_{21}(a_{22} + a_{11}); & a_{11}^2 + a_{12}a_{21} \end{matrix} \right\| \cdot \left\| \begin{matrix} a_{11}a_{12} \\ a_{21}a_{22} \end{matrix} \right\| = \left\| \begin{matrix} 1 & 0 \\ 0 & 1 \end{matrix} \right\|$$

As will be seen from the above, there results as the product of the matrices actually the unitary matrix, i. e. for a single frequency the combined four-terminal network will allow the desired currents to pass without loss.

Taking into consideration that $$(6)\quad a_{11}a_{22} - a_{12}a_{21} = 1$$

one finds that $$(8)\quad b_{11}b_{22} - b_{12}b_{21} = 1$$

i. e. that the determinant of the compensating four-terminal network so determined is actually unity.

Now follows a proof that the matrix $M_k$ is always realizable (i. e. a circuit which is purely passive can be constructed which has $M_k$ for its matrix), whenever the network is made up of only condensers and inductances. This proof does not limit the method to these types of networks, but does prove the general validity of the method in this, the most interesting case.

The following proof makes reference to a particular design for the realization of matrices, but this patent is in no way limited to circuits designed by this method, and, as shall be shown by example, in most applications it will not be necessary to make use of this method.

To effect the proof, first right and left-multiply the matrix equation (9) by M inverse ($M^{-1}$). M will always have an inverse since its determinant is not equal to zero. This gives:

$$(12)\quad M_K = (M^{-1})^2$$

Therefore the matrix $M_k$ will be realizable if the matrix $M^{-1}$ is realizable i. e. if $V_0$ is a four-pole having the matrix $M^{-1}$ then the system consisting of two networks $V_0$ connected in series will have the matrix $(M^{-1})^2$.

Now solving Equations 4 so as to get the quantities $\alpha_{11}$, $\alpha_{nn}$, $\alpha_{1n}$ expressed in terms of the elements of the matrix of the network, we have:

$$(13)\quad \alpha_{1n} = \frac{1}{B} \qquad \alpha_{11} = \frac{D}{B}$$
$$\alpha_{nn} = \frac{A}{B}$$

Now if $V_1$ and $V_2$ are two four terminal networks such that the matrix of $V_2$ is the inverse of the matrix of $V_1$ and if the matrix of $V_1$ is $$\begin{Vmatrix} C_{11} & C_{12} \\ C_{21} & C_{22} \end{Vmatrix} = C$$

then the matrix of $V_2$ must be $$C^{-1} = \begin{Vmatrix} C_{22} & -C_{12} \\ -C_{21} & C_{11} \end{Vmatrix}$$

and hence substitution of the appropriate elements in Equations 13 gives:

$$(\alpha_{1n})V_2 = -\frac{1}{C_{12}} = -(\alpha_{1n})V_1$$

(14)

$$(\alpha_{11})V_2 = -\frac{C_{22}}{C_{12}} = -(\alpha_{nn})V_1$$

$$(\alpha_{nn})V_2 = -\frac{C_{11}}{C_{12}} = -(\alpha_{11})V_1$$

Now if the circuit V is made up purely of inductances and capacitances, then each term $Z_{ij}$ in Equation 1 will be pure imaginary for simple sinusoidal frequencies and hence D and $M_{ij}$ in Equation 2a will be equal to $(j)^n k$ and $(j)^{n-1}k^1$ where K and $K^1$ are real quantities. Reference to Equation 2a then shows that $\alpha_{ij}$ are all pure imaginary numbers.

As pointed out in United States Patents 2,067,443 and 2,067,444 to Gewertz the following conditions are both necessary and sufficient on the quantities $\alpha_{11}$, $\alpha_{1n}$, $\alpha_{nn}$ in order to have a circuit with these $\alpha$'s be realizable. We are regarding the $\alpha$'s as functions of the variable $\lambda$ where $\lambda=\gamma+j\omega$ and $\omega=2\pi f$ ($f$ is the frequency)

1. $\alpha_{11}(\lambda)$, $\alpha_{nn}(\lambda)$, $\alpha_{1n}(\lambda)$ be real when $\lambda$ is real
2. $Re\alpha_{11} \geqq 0$; $Re\alpha_{nn} \geqq 0$ for $\lambda \geqq 0$
3. $Re\alpha_{11}Re\alpha_{nn}-(Re\alpha_{1n})^2 \geqq 0$ if $\gamma \geqq 0$ where $Re$ stands for "the real part of."

Now if $\alpha_{11}(\lambda_0)$, $\alpha_{nn}(\lambda_0)$, $\alpha_{1n}(\lambda_0)$ where $\lambda_0$ is the audio-frequency are pure imaginary quantities and satisfy conditions 1, 2, and 3 (since these are necessary conditions) then $-\alpha_{11}(\lambda_0)$, $-\alpha_{nn}(\lambda_0)$, $-\alpha_{1n}(\lambda_0)$ also satisfy these conditions and it is obvious there is an infinity of ways in which three functions $f_{11}(\lambda)$, $f_{nn}(\lambda)$, $f_{1n}(\lambda)$ can be constructed such that they satisfy these conditions and take on, respectively, the values $-\alpha_{11}(\lambda_0)$, $-\alpha_{nn}(\lambda_0)$, $-\alpha_{1n}(\lambda_0)$ for $\lambda=\lambda_0$. Therefore by the sufficiency of these conditions a circuit can be constructed having the desired values to make its matrix the inverse of the matrix M of VP (at $\lambda=\lambda_0$) whenever VP consists only of capacitances and inductances and therefore $M_k=(M^{-1})^2$ is also realizable.

Figure 2:
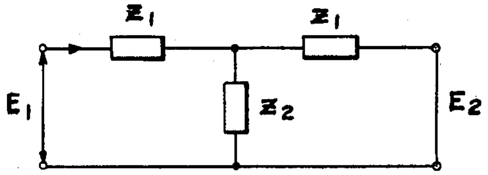
Fig. 2 is a form of embodiment of a four-pole.

In order to further clarify the idea of the invention consider the four-pole shown in Fig. 2. Let its matrix be $$M = \begin{Vmatrix} e_{11} & e_{12} \\ e_{21} & e_{22} \end{Vmatrix}$$

and for the compensating 4 pole $$M_k = \begin{Vmatrix} g_{11} & g_{12} \\ g_{21} & g_{22} \end{Vmatrix}$$

The elements of the matrix may be evaluated as follows:

For no load we obtain from Equations 3

(15) $I_2=0$: $E_{10}=e_{11}E_{20}$: $I_{10}=e_{21}E_{20}$ and from this $$\frac{E_{10}}{I_{10}} = Z_{10} = \frac{e_{11}}{e_{21}} = Z_1+Z_2$$

Now from (15)

$$e_{11} = \frac{E_{10}}{E_{20}}$$

and represents the voltage transformation ratio in the case of no load. This ratio can be read at once from Fig. 2. We have $$E_{20} = E_{10}\frac{Z_2}{Z_1+Z_2}$$

or $$e_{11} = \frac{E_{10}}{E_{20}} = \frac{Z_1}{Z_2}+1$$

and $$e_{21} = \frac{1}{Z_2}$$

On the other hand we obtain from the Equations 3 for short circuit:

$$E_2=0$$

(16a) $$E_{1sc}=e_{12}I_{2sc}$$

(16b) $$I_{1sc}=e_{22}I_{2sc}$$

(16c) $$\frac{E_{1sc}}{I_{1sc}} = Z_{1sc} = Z_1+\frac{Z_1Z_2}{Z_1+Z_2} = \frac{e_{12}}{e_{22}}$$

(16b) shows that $e_{22}$ is equal to the current transformation ratio in short circuit. This ratio, also, can be read at once from Fig. 2. The following holds good:

(17) $$I_{2sc} = I_{1sc}\frac{Z_1Z_2}{Z_1+Z_2}\cdot\frac{1}{Z_1} = I_{1sc}\frac{Z_2}{Z_1+Z_2}$$

(18) $$e_{22} = \frac{I_{1sc}}{I_{2sc}} = \frac{Z_1+Z_2}{Z_2} = \frac{Z_1}{Z_2}+1$$

(19)

$$e_{12} = e_{22}\left(Z_1+\frac{Z_1Z_2}{Z_1+Z_2}\right) = \left(\frac{Z_1+Z_2}{Z_2}\right)\left(\frac{Z_1Z_2}{Z_1+Z_2}+Z_1\right) = \frac{Z_1}{Z_2}(Z_1+2Z_2)$$

We thus obtain for the matrix:

$$\begin{Vmatrix} e_{ik} \end{Vmatrix} = \begin{Vmatrix} 1+\frac{Z_1}{Z_2} & \frac{Z_1}{Z_2}(Z_1+Z_2) \\ \frac{1}{Z_2} & 1+\frac{Z_1}{Z_2} \end{Vmatrix}$$

Figure 4:
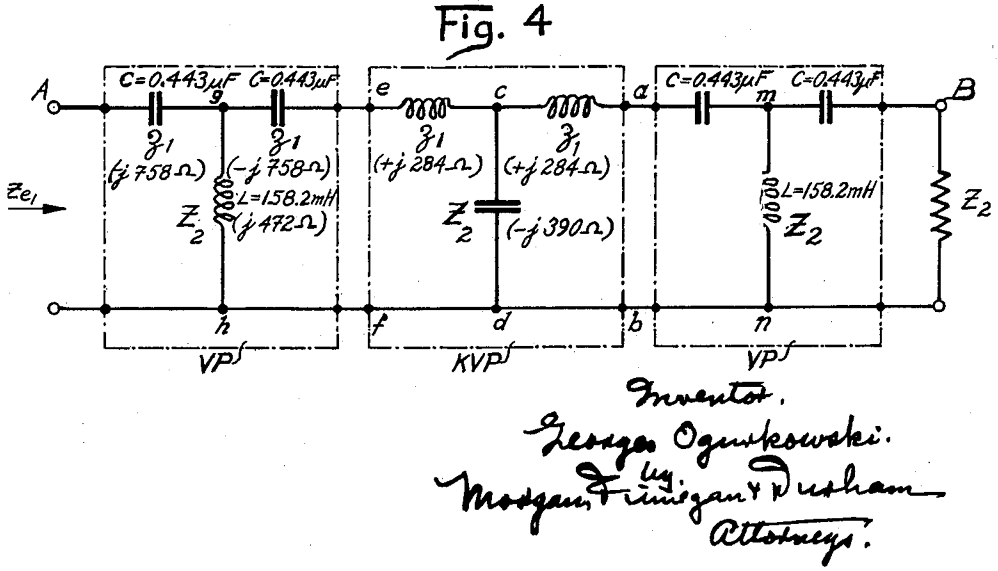
Fig. 4 is a form of embodiment of a four-pole combination according to Fig. 3.

Fig. 4 shows a form of embodiment of a four-pole combination VP-KVP-VP according to Fig. 3 in which the values of the connecting members of the compensation four-pole KVP were determined according to the above conditions. This proves at the same time that such a compensation four-pole can be readily reduced to practice.

Let the two four-poles VP be identical and the connecting members that are provided show the values entered in Fig. 4. Therefore:

$$Z_0=378\Omega;\ \omega_0=2670;\ \omega=2980$$

$$L\cdot C=0.0351\cdot10^{-6}$$

$$\frac{L}{C}=71.4\cdot10^4$$

For the matrix elements the following values are found according to the statements made:

$$e_{11} = \frac{-j758}{+j472}+1 = -0.605 = e_{22}$$

$$e_{12} = 2(-j758)+\frac{1}{j472}(-j758)^2 = -j1516+\frac{-j758}{+j472}(-j758) = -j301$$

$$e_{21} = \frac{1}{j472} = -j2.12\cdot10^{-3}$$

$$g_{11}=e_{22}^2+(e_{12})(e_{21})=(-0.605)^2+(-j301)(-j2.12\cdot10^{-3})=-0.272=g_{22}$$

$$g_{12}=-e_{12}(e_{11}+e_{22})=+j301(-0.605-0.605)=-j364$$

$$g_{21}=-e_{21}(e_{22}+e_{11})=+j2.12\cdot10^{-3}(-1.21)=j2.565\cdot10^{-3}$$

Thus one obtains for the matrix Mk of the compensation four-pole KVP:

$$M_k=(-1)\begin{Vmatrix}-0.272 & -j364\\ -j2.565\cdot10^{-3} & -0.272\end{Vmatrix}=\begin{Vmatrix}.272 & j364\\ j2.565\cdot10^{-3} & .272\end{Vmatrix}$$

$$|M_k|=.272^2-(j364)(+j2.565\cdot10^{-3})=.0739+.975^2\approx1$$

and from this the determinantal equations for the elements of the combination four-poles:

$$\frac{Z_1}{Z_2}+1=.272$$

$$\frac{1}{Z_2}=+j2.565\cdot10^{-3}$$

$$Z_2=-j390\Omega$$

$$\frac{Z_1}{Z_2}=-.728$$

$$Z_1=-.728(-j390)=+j284\Omega$$

For the control one calculates:

$$2Z_1Z_2+Z_1^2=2(+j284)(-j390)+(-j284^2)=141{,}000$$

$$g_{12}=\frac{141{,}000}{-j390}=+j362$$

The calculated values for $Z_1$ and $Z_2$ for the compensation four-pole KVP are entered in Fig. 4.

When $Z_2^x=\infty$, $Z_{ab}$ becomes $$-j758+j472=-j286\Omega$$

$$Z_{cd}=0$$

$$Z_{ef}=j284\Omega$$

$$Z_{gh}=(+j472)\ ||\ (+j284-j758)$$

$$=+j472 \quad -j474=\infty$$

Thus $$Z^x e_2=\infty$$

If $$Z_2^x=0,\ Z_{ab}$$

becomes $$-j758+(+j472)(-j758)$$

$$=-j758+\frac{(j472)(-j758)}{+j472-j758}$$

$$=-j758+\frac{(+j472)(-j758)}{-j286}$$

$$=j1758+j1250$$

$$=j499\Omega$$

$$Z_{cd}=-j390\ ||\ (+j284+j492)=-j390\ ||\ +j776$$

$$=\frac{(-j390)(+j776)}{+j776-j390}=\frac{(-j390)(+j776)}{+j386}=-j776\Omega$$

$$Z_{gh}=(+j472)\ ||\ (-j758+j284-j776)=(+j2472)\ ||\ (-j1250)$$

$$=\frac{(+j472)(-j1250)}{+j472-j1250}=\frac{(+j472)(-j1250)}{-j778}=+j760\Omega$$

$$Z^x e_2=-j758+j760\approx0$$

In order to investigate the behavior at the mains frequency of 50 cycles, where at the terminal resistance $Z_2$ the phase voltage of the mains frequency is, say, 28.8 kv., we consider only the right half of the arrangement.

The impedance between the connecting points *m, n* then amounts to:

$$Z_{mn}=(+j49.6)||(+j29.9-j7200-j3700)$$

$$=(+j49.6)||(-j10870)$$

$$=\frac{(+j49.6)(-j10870)}{-j10870+j49.6}\approx j49.7\Omega$$

Thus the voltage between *mn*:

$$E_{mn}=28800\cdot\frac{49.6}{7150}=200\text{ volt.}$$

This voltage is further reduced as far as to the connecting points *cd* to:

$$E_{cd}=200\frac{-j3700}{-j3700-j7200+j29.9}=200\frac{-j3700}{-j10870}=68$$

i. e. to only 2.36% of the mains voltage. This proves the realizability of a compensation four-pole KVP, which is connected between two equal four-poles.

It remains to be proved that there exists also for (−1) .Mk a realizable compensation four-pole. In this case there results the negative unit matrix.

The matrix of this compensating four-pole is written:

$$(-1)M_k=\begin{Vmatrix}-.272 & -j364\\ -j2.565\cdot10^{-3} & -.272\end{Vmatrix}$$

$$=(-.272^2)-(-j364)(-j2.565\cdot10^{-3})\approx1$$

i. e. the four-pole sought is again passive.

For the determination of the elements we obtain in this case:

$$\frac{Z_1}{Z_2}+1=-.272$$

$$\frac{1}{Z_2}=-j2.565\cdot10^{-3}$$

$$Z_2=+j390\Omega$$

$$Z_1=(-1.272)(+j390)=-j496\Omega$$

For the purpose of control we determine $$\frac{Z_1}{Z_2}(Z_1+2Z_2)=\frac{-j496}{+j390}(-j496+j780)=-j362\Omega$$

= For no load we now obtain:

$$Z_2=\infty$$

$$Z_{ab}=-j286\Omega$$

$$Z_{cd}=(-j286-j496)||(+j390)$$

$$=\frac{(-j782)(+j390)}{-j390+j782}=+j782\Omega$$

$$Z_{gh}=(+j472)||(-j758-j496+j782)=+j472||-j472=\infty$$

$$Z_{e2}=\infty$$

For the shoft circuit $Z_2=0$ we obtain:

$$Z_{ab}=+j492\Omega$$

$$Z_{cd}=(+j390)||(-j496+j492)\approx\infty$$

$$Z_{gh}=(+j472)||(-j758-j496)$$

$$=(+j472)||-j1254=\frac{(+j472)(-j1254)}{-j782}=j756\Omega$$

$$Z_e=-j758+j756\approx0$$

The two equal high-pass filters VP may thus be compensated for by one high-pass filter. This is important because it does not cause any change in the frequency characteristics.

By means of the above described filter, the audio-frequency coupling of two asynchronous networks can be effected without amplifiers or rotary machines being required for this purpose.

The above described filter consists solely of inductances, capacitors, mutual inductances and resistances, i. e. without any external sources of energy. It is also assumed that the inductances and capacitors employed are free from loss and are linear, i. e. none have a characteristic dependent on the value of the current or of the voltage. Through the said filter arrangement, the control energy can be transmitted without loss, i. e. without additional capacitive or inductive load. This property is especially advantageous when the audio-frequency energy has to be taken over long overhead lines to the intermediate coupling filter. Since the overhead lines have considerable inductive series reactances, a very large inductive load passed through any other intermediate coupling filter would produce such a high voltage drop that the operation of receivers in the coupled network would be rendered impossible by this intermediate coupling.

The invention in its broader aspects is not limited to the specific mechanisms shown and described but departures may be made therefrom within the scope of the accompanying claims without sacrificing its chief advantages.

This application is a continuation in part of my prior application Serial No. 673,503, filed May 31, 1946.

What is claimed is:

In combination, two alternating current power circuits which must be maintained separate for reasons of frequency or phase difference or differences of potential but which must be coupled together for an audio-frequency in connection with control or communication systems, each power circuit constituting an audio-frequency channel, three four-pole passive filter sections connected in series between said power circuits to form an audio-frequency cross-channel between said power circuit channels, said end filter sections having the same matrices, said end filter sections suppressing substantially completely the power frequencies of the power circuits to which they are respectively connected, said intermediate filter section between the end filter sections being a compensating section and having matrix elements of which $b_{11}$, $b_{12}$, $b_{21}$ and $b_{22}$ are determined from $a_{11}$, $a_{12}$, $a_{21}$ and $a_{22}$ of the end filter sections by the relations $$b_{11} = a_{22}^2 + a_{12} \cdot a_{21}$$

$$b_{12} = -a_{12} \cdot (a_{11} + a_{22})$$

$$b_{21} = -a_{21} \cdot (a_{22} + a_{11})$$

$$b_{22} = a_{11}^2 + a_{12} \cdot a_{21}$$

cooperating with such end filter sections that the cross channel passes the audio-frequency with minimum attenuation in either direction while maintaining the electrical separation of the power circuits for power frequencies.

References Cited in the file of this patent

UNITED STATES PATENTS 1,499,438 Affel ---------------------- July 1, 1924

OTHER REFERENCES

Terman: Radio Engineers' Handbook, published by McGraw-Hill Book Co., Inc., New York and London, in 1943, pp. 227 and 232. (Copy in Scientific Library.)